(12) United States Patent
Jalbout et al.

(10) Patent No.: US 11,434,576 B2
(45) Date of Patent: Sep. 6, 2022

(54) RECOVERY OF GOLD AND SILVER FROM PRECIOUS METALS-CONTAINING SOLIDS

(71) Applicant: METOXS PTE. LTD., Singapore (SG)

(72) Inventors: Abraham Fouad Jalbout, Tucson, AZ (US); Hassan Elsentriecy, Tucson, AZ (US)

(73) Assignee: CLEAN RESOURCES PTE. LTD, Singapore (SG)

( * ) Notice: Subject to any disclaimer, the term of this patent is extended or adjusted under 35 U.S.C. 154(b) by 418 days.

(21) Appl. No.: 16/467,885

(22) PCT Filed: Aug. 11, 2017

(86) PCT No.: PCT/IB2017/054923
§ 371 (c)(1),
(2) Date: Jun. 7, 2019

(87) PCT Pub. No.: WO2018/104803
PCT Pub. Date: Jun. 14, 2018

(65) Prior Publication Data
US 2019/0368060 A1 Dec. 5, 2019

Related U.S. Application Data

(60) Provisional application No. 62/431,691, filed on Dec. 8, 2016.

(51) Int. Cl.
*C25C 3/34* (2006.01)
*C25C 7/00* (2006.01)

(52) U.S. Cl.
CPC ................. *C25C 3/34* (2013.01); *C25C 7/005* (2013.01)

(58) Field of Classification Search
CPC .................................. C25C 3/34; C25C 7/005
See application file for complete search history.

(56) References Cited

U.S. PATENT DOCUMENTS 4,670,114 A * 6/1987 Beer ....................... C25B 15/02
205/508
5,238,662 A 8/1993 Dubrovsky
(Continued)

FOREIGN PATENT DOCUMENTS

CN 103421953 A 12/2013
WO WO-2006074523 A1 * 7/2006 ............... C25C 3/34

*Primary Examiner* — Ciel P Contreras
(74) *Attorney, Agent, or Firm* — Blank Rome LLP (57) ABSTRACT

System for, and methods of, recovering precious metals from precious metals-containing solids are described herein. Methods for the recovery of precious metals from precious metals-containing solids heating a salt mixture to form a molten salt mixture, adding a precious metals-containing solid to the molten salt mixture to form a molten salt/precious metals-containing solids mixture, adding an oxidizing agent to the molten salt/precious metals-containing solids mixture, forming a liquid solution from molten salt/precious metals-containing solids mixture, the liquid solution comprising soluble precious metal salts, and subjecting the liquid solution to an electrodeposition process to form purified precious metals. Systems for, and methods of, recovery precious metals from precious metals-containing solids allow for the recovery of salt mixtures and reuse of the salt mixtures in subsequent precious metals recovery operations.

20 Claims, 4 Drawing Sheets

(56) References Cited

U.S. PATENT DOCUMENTS

| | | |
|---|---|---|
| 6,551,378 B2 | 4/2003 | Farone et al. |
| 2006/0169590 A1* | 8/2006 | Hebditch .................. C25C 3/34 |
| | | 205/46 |
| 2009/0045070 A1* | 2/2009 | Becker ...................... C25C 3/26 |
| | | 205/220 |
| 2012/0138475 A1* | 6/2012 | Dudley ..................... C22B 4/08 |
| | | 205/346 |
| 2014/0076735 A1 | 3/2014 | Lapidus et al. |
| 2014/0291161 A1* | 10/2014 | Awazu ...................... C25C 3/02 |
| | | 205/348 |
| 2016/0068928 A1 | 3/2016 | Jalbout et al. |
| 2017/0159190 A1* | 6/2017 | Fournier ................... C01F 5/30 |
| 2018/0112289 A1* | 4/2018 | Foley ........................ C22B 3/16 |

* cited by examiner

RECOVERY OF GOLD AND SILVER FROM PRECIOUS METALS-CONTAINING SOLIDS

CROSS-REFERENCE TO RELATED APPLICATIONS

This application is a U.S. National Stage Application of PCT/IB2017/054923, filed Aug. 11, 2017, which claims priority to U.S. Provisional Application No. 62/431,691, filed on Dec. 8, 2016. The entire contents of those applications are incorporated herein by reference.

FIELD OF THE INVENTION

The present invention relates to the recovery of gold and silver from precious metals-containing solids such as ores or slag by-products. The present invention further relates to environmentally friendly methods and systems for the recovery of gold and silver from precious metals-containing solids using high temperature molten salt mixtures and oxidizing agents.

BACKGROUND OF THE INVENTION

Copper, silver and gold are valuable metals prized for their desirable properties such as ductility, strength, electrical conductivity as well as stability and durability. Accordingly, these materials are used when a stable metal is required for commercial applications such as in the electronics, plumbing and jewelry industries. The reason for the chemical stability of copper, silver and gold is similar; it is due to the high reduction potential of the ions of these metals. Because these valuable metals have high reduction potentials, they have similar processing conditions. The conventional processing conditions presently used to extract metal ion from ore involves toxic and aggressive chemical reagents in water, followed by application of electrical energy to electrodes in aqueous solution of complex copper, silver or gold ions, which decomposes the metal ion complexes leading to the deposition of the desired metal. The conventional processing is expensive and environmentally invasive, but is tolerated because of the value of these metals.

Copper, silver and gold are often found the same ore. Typically, gold is the least abundant; silver is more abundant and copper is the most abundant naturally occurring species. The conventional processing is used to produce copper on a large scale, which leads to the accumulation of a substantial amount of toxic materials, which time to time is dumped into the environment (soil and ground water) due to accidents, such as flooding from violent weather.

Conventional metal mining operations, such as for copper, silver, and gold, have the primary purpose of extracting pure metals from ore. To do this, mining operations use a number of different vessels or pots for various mining and extraction steps. For example, in copper mining the copper ore is concentrated by crushing followed by roasting. During the roasting step, the crushed copper ore is heated while being exposed to air (e.g. in an open air vessel). The oxygen and water in the air convert copper sulfides to copper oxides. Next, the copper oxides are smelted by reheating in the presence of a chemical reducing agent, which separates the copper metal from undesirable elements. These undesirable elements are given off as noxious gases, or they float in the smelting vessel as a material called slag, while the desired copper metal base sinks in the smelting vessel and is called matte. The matte is then collected and dissolved in a strong acid, such as aqueous sulfuric acid. Applying electrical power to cathodes in this acidic copper solution yields pure copper. And yet, there are still residual amounts of copper that can be recovered from the slag. Furthermore, many processes directed to the recovery of copper from ores, while exhibiting good copper recoveries, do not exhibit good gold and silver recoveries.

The process of slag recovery in mining has been an issue of attention for ecological, economical and logistical reasons. Unfortunately there are a number of problems associated with slag. Slag is typically dumped or used as road ballast, backfill material, sandblasting agents, cement additives, or material for roofing shingles. However, slag can seep into river water, streams, soil, and surroundings which can be dangerous to the environment because slag contains heavy metal pollutants. Also, slag contains base metals (such as zinc and iron), some coinage metals (e.g. copper) and a valuable amount of precious metals (e.g. gold and silver) that are not extracted and get wasted. The slag is also extremely hot (e.g. up to about 1650° C.). Slag is normally poured into slag pits and allowed to cool. It would be extremely beneficial if the thermal energy from the cooling slag could be used in the leaching process (e.g. via heat transfer) in order to minimize the costs and equipment required to heat the metal extraction process.

There has been increasing attention paid to hydrometallurgical processes to recover precious metals from the slag that forms during smelting processes. Research has focused on leaching processes at atmospheric pressure, using lixiviants such as acids and bases. Metals such as copper, silver and gold in the slag may be recovered using these leaching processes, but acids and bases are extremely harmful to the environment.

The cyanide method is also used for extracting metals from ore and slag, such as gold, copper, silver and gold. Unfortunately, the cyanide method of metal extraction is undesirable due to the highly poisonous nature of cyanide. As a result, the cyanide method is banned in a number of countries and territories.

Therefore, there is a need within the mining industry for an economical, efficient, and environmentally friendly process and system to precious metals, such as gold and silver, from slag when the slag is produced by conventional leaching methods. It would also be beneficial if the same environmentally benign process could extract metal from both the ore and the slag produced by the ore, either concurrently, or sequentially. It would also be beneficial if the thermal energy needed to heat reagents during the leaching process came from pre-heated slag, versus the use of conventional heating equipment-ovens, etc. It would be economically and environmentally beneficial if the reagents in the environmentally friendly leaching process could be re-cycled and used with sequential leaching processes on new ore and/or slag material.

DETAILED DESCRIPTION

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the terms "about" or "approximately." The use of the terms "about" and "approximately" apply to all numeric values, whether or not explicitly indicated. This terms generally refer to a range of numbers that one of ordinary skill in the art would consider as a reasonable amount of deviation to the recited numeric values (i.e., having the equivalent function or result). For example, these terms can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

For the purposes of this specification and appended claims, the term "coupled" refers to the linking or connection of two objects. The coupling can be permanent or reversible. The coupling can be direct or indirect. An indirect coupling includes connecting two objects through one or more intermediary objects. The term "fluidically coupled" refers to the linking or connection of two objects which allows for the flow of a fluid (that is, a liquid, solution, or gas) between the two objects. The term "fluid communication" means the flow of a fluid from one object to another object. The term "substantially" refers to an element essentially conforming to the particular dimension, shape or other word that substantially modifies, such that the component need not be exact. For example, substantially circular means that the object resembles a circle, but can have one or more deviations from a true circle.

For the purposes of this application, the term "ore" refers to any naturally occurring solid material or concentrate of a naturally occurring solid material from which metals or minerals can be extracted such as, but not limited to mesothermal lodes, archaean conglomerates, Carlin-type gold deposits, epithermal stockwork vein deposits, alluvium, black sand, exhalative spilite-chert, free-milling original ores, free-milling ores concentrates, single refractory (sulfidic or carbonaceous) original ores, single refractory (sulfidic or carbonaceous) concentrates, double refractory (sulfidic and carbonaceous) original ores, and double refractory (sulfidic and carbonaceous) ores concentrates.

The various embodiments of the present disclosure comprise systems, apparatuses, and processes for the extraction of precious metals from ores and/or from slag generated as a by-product in ore refining processes using low vapor pressure liquids, such as molten salt mixtures or ionic liquids. This environmentally friendly leaching process is an alternative to conventional methods of metal extraction that use acids, bases or cyanide. The system and process disclosed herein allow for the extraction of precious metals from ores, slag by-product or any other solid composition containing an appreciable precious metals content.

Extractions from ore, slag by-product or any other suitable precious metals-containing solids may occur concurrently, or sequentially (i.e. ore then slag). Therefore, embodiments of the present disclosure for precious metals extraction from precious metals-containing solids can completely replace a mining operation that relies upon toxic leaching processes using acids, bases, cyanide, etc. In some instances, ore and slag by-product are processed concurrently using the environmentally friendly leaching process of low vapor pressure reagents. In other instances, ore and slag by-product are processed sequentially using low vapor pressure liquids, such as molten salt mixtures or ionic liquids, and a gaseous or non-gaseous oxidizing agent.

The environmentally friendly leaching process disclosed herein comprises the use of low vapor pressure liquids, such as molten salt mixtures or ionic liquids, and a gaseous or non-gaseous oxidizing agent for dissolving, extracting and solubilizing metals from the precious metals-containing solids, ores and/or slag by-products and recovering them by electrodeposition. In one or more embodiments, such as for small scale operations, extraction, solubilizing and electrodeposition occur sequentially in the same vessel (e.g. crucible, pot, kettle, container, etc.). Additionally, the present disclosure describes large scale mining operations where the metal extraction, solubilization and electrodeposition are conducted in close proximity to each other, but in separate vessels, or co-located at the same facility.

The molten salt mixtures or ionic liquids used in the present disclosure do not have appreciable vapor pressure so they practically are not able to transition from a liquid phase to a vapor phase until temperatures are considerably higher than 1000° C. because formation of salt vapor is inhibited by electrostatic attraction with the bulk salt. Contrarily, conventional leaching processes using aqueous acid and base electrolytes would not be suitable at such high temperatures because water boils at 100° C.

In accordance with various aspects of the present disclosure, precious metals can be recovered from ores, slag by-products, or other precious metals-containing solids using a multi-vessel extraction and electrodeposition apparatus. Each vessel can be a crucible, reactor, container or any other suitable reaction vessel. Multi-vessel extraction and electrodeposition apparatuses in accordance with various aspects of the present disclosure can include an open-air or sealable mixing vessel able to receive, heat and solubilize precious metals (in the form of a salt) contained within a solid that is aerobically or non-aerobically mixed with a low vapor-pressure molten salt mixture, or ionic liquid, and a gaseous or non-gaseous oxidizing agent; a mechanism to remove the undissolved slag or ore from the mixture (e.g. by filtration or decanting); and an electrochemical reactor coupled with the mixing vessel and configured to receive a liquid solution containing the solubilized precious metal salts and conduct electro-deposition to remove the purified precious metals from the liquid solution by depositing them on a cathode electrode. If a sealable mixing vessel is used, the mixing vessel can further comprise a pressure regulator assembly configured to release gas from the mixing vessel to avoid potentially dangerous over-pressurized conditions.

In accordance with various aspects of the present disclosure, an electrochemical reactor can include a high temperature resistant crucible for storing the liquid solution; one or more cathode electrodes and one or more anode electrodes connected to a direct current power supply on an upper end, and immersed in the liquid solution on a bottom end; and one or more valves to drain the electrified liquid solution from the reactor crucible and into a movable re-cycle tank. In accordance with various aspects of the present disclosure, each of the one or more cathode electrodes are metal plates, rods or any form of any electrically-conducting material that is compact and can serve as cathode in this electrodeposition process. In accordance with various aspects of the present disclosure, each of the one or more anode electrodes are graphite plates, rods or any other form of graphite that can serve as anode in this electrodeposition process.

The movable re-cycle tank is configured to first receive dense precious metals (e.g. gold and silver) and then be replaced by an empty tank for receiving the precious metals-depleted electrified liquid solution comprising the molten salt mixture or ionic liquid, which can then be used to transport the electrified liquid salt solution back to the mixing crucible and/or a heat exchanger unit. In an embodiment, the re-cycle tank is heat and liquid sealed to prevent significant loss of heat and the used liquid solution.

The precious metals leaching system may further comprise a heat exchanger unit to re-heat the re-cycled electrified liquid solution (i.e. used molten salt mixture or ionic liquid). The heat exchanger unit can include comprise high temperature melted slag from ore smelters that transfers its heat to the electrified liquid solution before being poured back into the mixing vessel.

In accordance with various aspects of the present disclosure, precious metals can be recovered from precious metals-containing solids using a one pot-metal extraction and electrodeposition apparatus. Such an apparatus can include a high temperature resistant, corrosion resistant outer crucible, wherein the outer crucible comprises non-porous glassy carbon material, or non-porous ceramic-filled graphite or quartz or a non-porous ceramic material; a high temperature resistant, corrosion resistant inner crucible centered within a bottom of the outer crucible, wherein the inner crucible is cathodic (i.e. functions as a cathode in an electric circuit), and the inner crucible comprises porous graphite or non-porous glassy carbon material or a non-porous ceramic-filled graphite; a molten salt mixture within the inner crucible produced by combining a low melting aerated chloride salt and ore or slag by-product; an oxidizing agent added to the molten salt mixture/ore or slag byproduct an anode rod positioned vertically within the inner crucible; a power supply operatively connected to the inner crucible cathode and the anode rod; and, a means to stir for continuously mixing the molten salt and slag/ore within the inner crucible. If the oxidizing agent is gaseous, the one pot-metal extraction and electrodeposition apparatus can further include a gas injection means for addition of the gaseous oxidizing agent into the inner crucible.

During methods of using of a one pot-metal extraction and electrodeposition apparatus, slag by-product and/or ore are inserted into the inner crucible and stirred into molten salt or ionic liquid to form a mixture. An oxidizing agent is then added to the mixture and stirred under heat for a predefined period of time to form soluble precious metal salts (i.e., gold salts and silver salts). The precious metal salts are then extracted and pure metals are recovered by an electrodeposition process. The area within the outer crucible that encases the inner crucible outer wall can include a material of high temperature that is used to heat the inner crucible (e.g. melted slag, etc.).

In some embodiments, the molten salt mixture within the inner crucible is maintained at a viscosity of less than 100 centipoise. Typically this can be achieved by maintaining a temperature between about 200° C. and 800° C., alternatively between about 300° C. and 500° C. or any other temperature bringing about a viscosity of less than 100 centipoise for the mixture. For certain metals or salts, a higher temperature may be necessary to achieve this viscosity. In accordance with various aspects of the present disclosure, a molten salt mixture (or ionic liquid) to precious metals-containing solids (such as ore or slag by-product) ratio of about 10:1 to about 1:1 is used, alternatively a ratio of about 8:1 to about 1:1 is used, alternatively about 6:1 to about 2:1 is used, and alternatively a ratio of about 4:1 to about 3:1 is used.

In accordance with various aspects of the present disclosure, processes for extracting metal from ore or slag first comprises providing a one-pot apparatus comprising: 1) a high temperature resistant, corrosion resistant outer crucible; 2) a high temperature resistant, corrosion resistant inner crucible centered within a bottom of the outer crucible, wherein the inner crucible is a cathode and stores an aerated molten salt that is produced by combining a low melting point aerated chloride salt with an ore and/or slag by-product and a gaseous or non-gaseous oxidizing agent; 3) a heated material within the outer crucible and encircling the inner crucible, and able to maintain the inner crucible at a temperature between about 200° C. and 800° C., alternatively between about 300° C. and 500° C.; and 4) an anode rod positioned vertically within the inner crucible. While a temperature of about 300° C. to 500° C. is preferred, the process may include any temperature where viscosity of the molten salt mixture, oxidizing agent, and ore and/or slag by-product mixture is less than 100 centipoise. In some instances, the inner crucible comprises porous graphite, non-porous glassy carbon material or non-porous ceramic filled material and the outer crucible comprises non-porous glassy carbon material or non-porous ceramic-filled graphite or quartz or a non-porous ceramic material.

In accordance with various aspects of the present disclosure, processes for extracting metal from ore or slag further comprises mixing the aerated molten salt mixture in the inner crucible with ore and/or slag by-product and gaseous or non-gaseous oxidizing agent until the precious metals dissolve in the molten salt mixture, forming soluble precious metal salts. In an embodiment, mixing occurs for about one to four hours at a temperature of about 200° C. and about 800° C., alternatively between about 300° C. and about 500° C.

In accordance with various aspects of the present disclosure, processes for extracting metal from ore or slag further comprises coupling a power supply to the cathode and anode and applying an electrical current therebetween.

In accordance with various aspects of the present disclosure, processes for extracting metal from ore or slag further comprises recovering purified molten and/or solid precious metals such as gold and silver from the one-pot apparatus.

Figure 1:
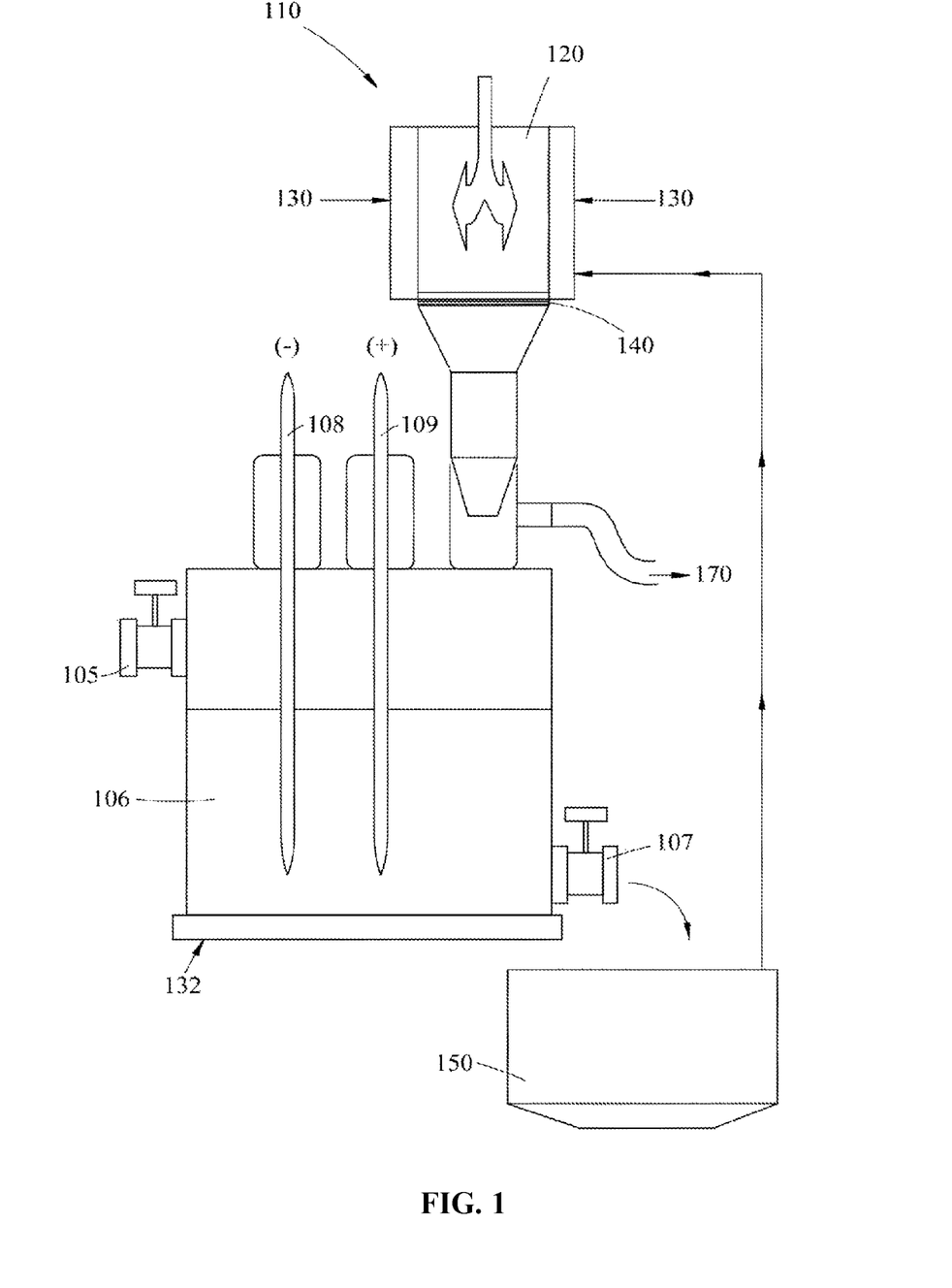
FIG. 1 is schematic illustration of an exemplary multi-vessel extraction and electrodeposition apparatus for the recovery of gold and silver from a precious metals-containing solid in accordance with various to various aspects of the present disclosure.

FIG. 1 is schematic illustration of an exemplary multi-vessel extraction and electrodeposition apparatus for the recovery of gold and silver from a precious metals-containing solid in accordance with various to various aspects of the present disclosure. In FIG. 1, precious metal-containing solids 110 (e.g. ores, slag by-products or other solids comprising gold and/or silver) are added to and stirred in a crucible 120 which contains a high temperature, molten salt mixture or ionic liquid recycled from a tank 150. The crucible 120 can be exposed to air, meaning that the top of the crucible 120 remains uncovered or that air is stirred into the liquid solution, or the crucible can be a sealed system, meaning that the top of the crucible can be sealed to prevent air or the external environment from interacting with the interior of the crucible 120. When the crucible 120 is designed to be sealed, a portion of the sealed top can have one or more of a gas injection valve for the injection of, for example, a gaseous oxidizing agent, into the crucible 120, a reagent addition assembly for the addition of solids, liquids, or solutions into the crucible 120, and a pressure release assembly for the prevention of over-pressurization of the sealed crucible 120.

The precious metal-containing solids 110 can be added to crucible 120 via standard machinery known in the art, such as via a crane or conveyer belt. The re-used molten salt mixture or ionic liquids may be pumped or poured into the crucible 120 from the re-cycle tank 150.

Heat can be applied to the crucible 120 and the precious metals from precious metal-containing solids 110 dissolve into the molten salt or into the ionic liquid, and the mixture is stirred to digest the precious metal-containing solids 110. A gaseous or non-gaseous oxidizing agent can then be added to the crucible 120 to convert the dissolved precious metal ions into soluble metal salts. The source of the heat 130 may be melted slag from ore smelters (having a temperature of up to 1650° C.) and/or standard heat generating devices known by one of skill in the art.

The liquid solution, which includes the molten salts mixture or ionic liquids and solubilized precious metal salts, can then be passed through a filtration assembly 140 by gravity or a vacuum pump 170. Excess slag residue can be discarded by inverting the crucible by using, e.g., a crane or other mechanical method. The remaining solution enters a crucible 106 which is subjected to heat via a heat source 132. The crucible 106 comprises a pair of electrodes 108 (anode) and 109 (cathode). The crucible 106 further comprises a pressure release mechanism 105 as a safety mechanism for when the pressure becomes too high within the crucible 106. The crucible 106 further comprises a valve 107 to first drain purified molten precious metals into a recycling tank 150 and then to drain the used metal depleted molten salt mixture or ionic liquid into the tank 150. The used, heated molten salt mixture in the recycling tank 150 can then transported back to and added into the crucible 120, via for example the use of a crane. One of skill in the art would readily know of mechanisms to transfer used molten salt mixtures or ionic liquid from the tank 150 to crucible 120 (e.g. automated rail movement, vehicle operated by driver, etc.). Thus the hot molten salt mixture is re-cycled to reduce operating cost for materials and for heating.

During the electrodeposition step a variety of types of electrodes 108, 109 can be used, (e.g. graphite, glassy carbon, or any suitable metal or alloy). During electrodeposition, purified precious metals form on the cathode 109. As the purified precious metals form on the cathode 109, the anode 108 will oxidize to carbon dioxide due to the presence of trace water in the molten salt mixture if in contact with air. The water ultimately comes from the air. In some instances, the crucible can have more than one anode electrodes 108 and/or more than one cathodes electrodes 109. Specifically, in some instances, the crucible can have between 2 and 10 anode electrodes 108 and/or between 2 and 10 cathode electrodes 109. In some instances one or each of the anode electrodes 108 can be graphite plates. In some instances, one or each of the cathode electrodes 109 can be metal or alloy plates.

In some instances, the crucible 130 may be omitted. The low viscosity molten salt mixture or ionic liquid can be poured or pumped directly to the crucible 106, the precious metal-containing solids 110 can be added via, for example, a crane or conveyor belt, and the oxidizing agent, if in the form of a solid, liquid or solution, can be poured or pumped into the low viscosity molten salt mixture or ionic liquid, now located in the crucible 106, or injected, bubbled or otherwise dispersed into the low viscosity molten salt mixture or ionic liquid if in the form of a gas. Mixing can be carried out manually or using an automated means, and crucible 106 can be heated via the heat source 132 until the precious metals from the precious metal-containing solids 110 are converted to soluble metal salts.

A power supply (not shown) can then be connected to the electrodes 108 and 109 and a current applied between them to convert the precious metal salts to purified metals. The residual solids (undissolved) and the molten salt mixture float while the isolated metals (gold and silver) sink to the bottom of the crucible 106 where they are drained out at the valve 107 into the tank 150 to form a precious metals billet.

The anode electrode 108 and the cathode electrode 109 can then be removed from the crucible 106 and the crucible 106 can be inverted to dump the residual slag using, for example, a crane. The crucible 106 can then be turned back upright and refilled, and the anode electrode 108 and the cathode electrode 109 can be dropped back into place.

Figure 2:
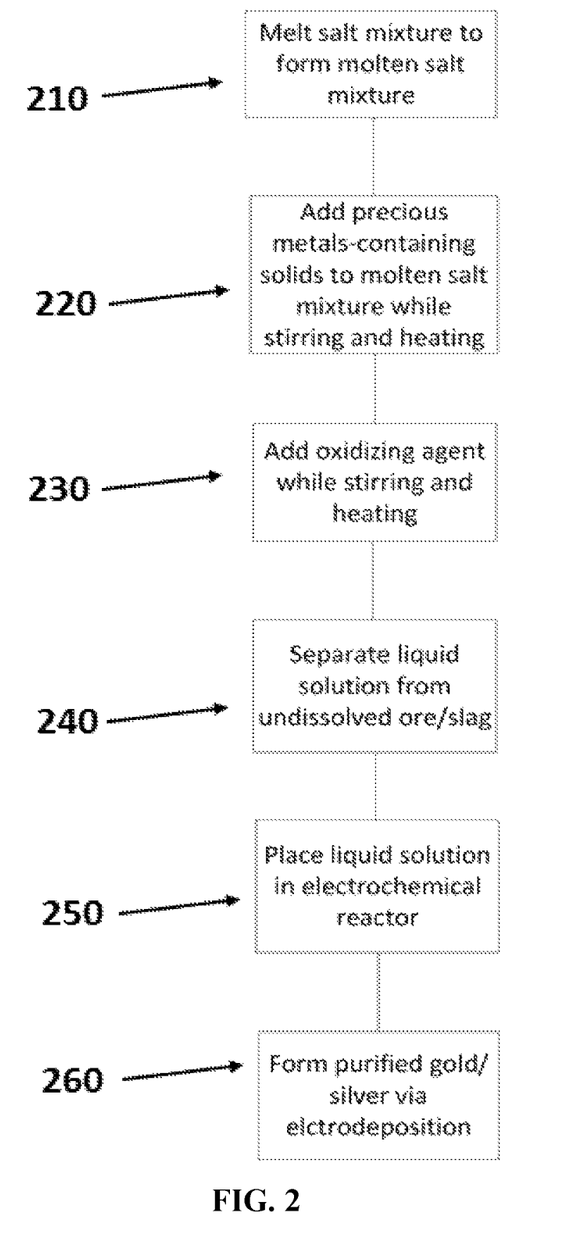
FIG. 2 is a flowchart illustrating a method of recovering gold and silver from a precious metals-containing solid using a multi-vessel extraction and electrodeposition apparatus in accordance with various aspects of the present disclosure.

FIG. 2 is a flowchart illustrating a method of recovering gold and silver from a precious metals-containing solid using a multi-vessel extraction and electrodeposition apparatus in accordance with various aspects of the present disclosure. In block 210, a salt mixture is heated to form a molten salt mixture. The salt mixture can be a mixture of NaCl, KCl and $ZnCl_2$. In some instances, the salt mixture can be a eutectic mixture having a molar ratio of approximately 0.5:0.5:1.0 (NaCl:KCl:ZnCl$_2$). In some instances, the salt mixture can have about 7.5 to about 20 mol % NaCl, alternatively about 10 to about 17.5 mol % NaCl, alternatively about 12.5 to about 15 mol % NaCl, and alternatively about 13 to about 14 mol % NaCl. In some instances, the salt mixture can have about 25 to about 40 mol % KCl, alternatively about 27.5 to about 37.5 mol % KCl, alternatively about 30 to about 35 mol % KCl, and alternatively about 33 to about 34 mol % KCl. In some instances, the salt mixture can have about 40 to about 70 mol % ZnCl$_2$, alternatively about 45 to about 65 mol % ZnCl$_2$, alternatively about 50 to about 60 mol % ZnCl$_2$, and alternatively about 52.5 to about 55 mol % ZnCl$_2$. In some instances, a portion or all of the ZnCl$_2$ can be replaced with AlCl$_3$, CaCl$_2$), LiCl and/or MgCl$_2$. To convert the salt mixture to a molten salt mixture, the salt mixture can be heated, with or without stirring, at a temperature ranging from about 200° C. to about 800° C., alternatively about 250° C. to about 500° C., alternatively about 300° C. to about 450° C., and alternatively about 350° C. to about 400° C.

In some instances, one or more ionic liquids are used instead of a salt mixture. When one or more ionic liquids are used instead of a salt mixture, the one or more ionic liquids are heated, with or without stirring, at any of the above identified temperatures ranges.

In block 220, an ore or a slag by-product containing precious metals (collectively referred to as "precious metals-containing solids" is added to the molten salt mixture and stirred while heating at a temperature in a range as defined above with regard to molten salt mixture formation. Stirring is performed until sufficiently complete mixing of the molten salt mixture (or one or more ionic liquids) and the precious metals-containing solids is accomplished. The stir rate can be about 100 to about 1000 rotations per minute (rpm), alternatively about 200 to about 800 rpm, alternatively about 300 to about 700 rpm, alternatively about 400 to about 600 rpm, and alternatively about 500 rpm. The time required to ensure sufficiently complete mixing of the molten salt mixture and the precious metals-containing solids can range from about 1 minute to about 1 hour, alternatively about 5 to about 30 minutes, and alternatively about 10 to about 15 minutes.

In block 230, an oxidizing agent is added to the molten salt/precious metals-containing solids mixture and stirred while heating at a temperature in a range as defined above with regard to molten salt mixture formation. In some instances the oxidizing agent is a gas. In some instances, the gaseous oxidizing agent is pure or substantially pure oxygen (O$_2$). In other instances, the gaseous oxidizing agent can be pure or substantially pure ozone (O$_3$), nitrous oxide (N$_2$O), nitric oxide (NO) or any other suitable gaseous oxidizing agent which leads to the formation of soluble gold salts and soluble silver salts. In some instances, the oxidizing agent is a non-gaseous compound having one or more cations and one or more anions. The one or more cations of the non-gaseous compound can include, for example, Li$^+$, Na$^+$, K$^+$, Be$^{2+}$, Mg$^{2+}$, Ca$^{2+}$, Sr$^{2+}$, Ba$^{2+}$, Al$^{3+}$, Sn$^{4+}$, Sn$^{2+}$, NH$_4^+$, PH$_4^+$, a primary ammonium or phosphonium cation, a secondary ammonium or phosphonium cation, a tertiary ammonium or phosphonium cation, and a quaternary ammonium or phosphonium cation. In some instances, it is preferable that the non-gaseous compound have Na$^+$ or K$^+$ as the cation. The one or more anions of the non-gaseous compound can include, for example, nitrate, nitrite, hydroxide, phosphate, hydrogen phosphate, dihydrogen phosphate, carbonate, bicarbonate, hypochlorite, chlorite, chlorate, perchlorate, hypobromite, bromite, bromate, perbromate, hypoiodite, iodite, iodate, periodate, acetate, permanganate, chromate, dichromate, and oxalate. In some instances, it is preferable that the non-gaseous compound has chlorate or bromate as the anion. In some instances, it is preferable that the non-gaseous compound has nitrate or nitrite as the anion. In accordance with various aspects of the present disclosure, compounds such as potassium chlorate, sodium chlorate, potassium nitrate, sodium nitrate, potassium dihydrogen phosphate, sodium bromate or potassium bromate are particularly useful oxidizing agents.

When a gaseous oxidizing agent is used, the gaseous oxidizing agent can be added to the molten salt/precious metals-containing solids mixture by injecting, bubbling or otherwise dispersing the gas therein while stirring at a stir rate in a range as defined above with regard to molten salt/precious metals-containing solids mixture formation. The gaseous oxidizing agent can be injected, bubbled or otherwise dispersed from a gas source at a rate ranging from about 10 to about 500 standard cubic centimeters per minute (sccm), alternatively about 25 to about 400 sccm, alternatively about 50 to about 300 sccm, alternatively about 75 to about 200 sccm, and alternatively about 100 to about 150 sccm. The gaseous oxidizing agent can be injected, bubbled or otherwise dispersed into the molten salt/precious metals-containing solids mixture for a period of time ranging from about 15 minutes to about 6 hours, alternatively about 30 minutes to about 4 hours, alternatively about 1 hour to about 3 hours, and alternatively about 2 hours. After injecting, bubbling or otherwise dispersing the gaseous oxidizing agent defined period of time, a liquid solution containing soluble gold and silver salts is produced and addition to of the oxidizing agent is terminated.

When a non-gaseous oxidizing agent is used, the non-gaseous oxidizing agent can be added to the molten salt/precious metals-containing solids mixture as either a single mass or incrementally over a pre-defined period of time. After addition of the non-gaseous oxidizing agent is complete, the mixture is allowed to react while stirring under heat. The mixture can be allowed to react for a period of time ranging from about 15 minutes to about 6 hours, alternatively about 30 minutes to about 4 hours, alternatively about 1 hour to about 3 hours, and alternatively about 2 hours, to form a liquid solution containing soluble gold and silver salts.

In some instances, both of a gaseous and a non-gaseous oxidizing agent can be used in block 230.

In block 240, the liquid solution, containing soluble gold and silver salts, is then separated from undissolved ore, slag, and any other remaining solids. Separation can be conducted by filtration, decantation, gravity separation, or any other suitable solid-liquid separation technique known to one of skill in the art. The solids can be dumped after removal of the liquid solution, for example by inverting the vessel, which can then be reused to transfer heat to a new liquid solution of precious metals-containing solids and molten salt mixture.

In block 250, the liquid solution, now free of solids, is placed in an electrochemical reactor, such as the crucible 106 of FIG. 1. In block 260, gold and silver ions from the liquid solution are electrodeposited as pure metals on a cathode of the electrochemical reactor, or sink to the bottom of the electrochemical reactor, while carbon dioxide forms at an anode of the electrochemical reactor using an applied voltage. The applied voltage can range from about 2.5 to 4 volts. The current density can range from about 30 to about 50 mA/cm$^2$. The metal electrodeposited on the surface of the cathode can be retrieved by removing the cathode from the electrochemical cell and removing the metal therefrom. The formed metal that is not electrodeposited on the cathode, being denser than the remaining liquid solution containing the molten salt mixture, sinks to the bottom of the electrochemical reactor and can be poured out from said bottom. The precious metal-depleted liquid remaining on top in the electrochemical reactor can then be recycled and reused in the extraction of metal from new precious metals-containing solids.

Figure 3:
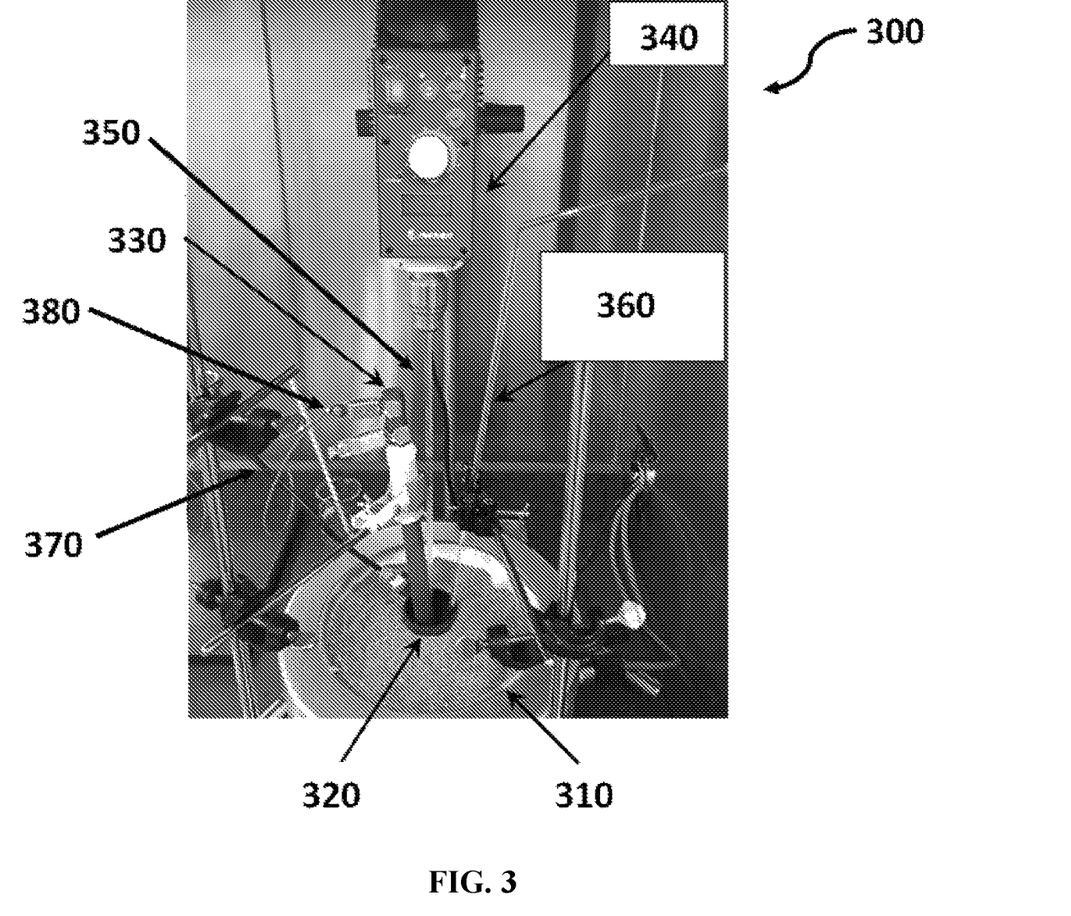
FIG. 3 illustrates an exemplary one pot-metal extraction and electrodeposition apparatus for the recovery of gold and silver from a precious metals-containing solid in accordance with various to various aspects of the present disclosure.

FIG. 3 illustrates an exemplary one pot-metal extraction and electrodeposition apparatus for the recovery of gold and silver from a precious metals-containing solid in accordance with various to various aspects of the present disclosure. The one pot apparatus 300 includes a heating element 310, a reaction crucible 320 centered in the heating element 310 and extending longitudinally through a portion thereof, and an anode electrode 330 positionable in the reaction crucible 320. The one pot apparatus 300 further includes a motor 340 coupled with an impeller 350 or other stirring element for stirring contents disposed within the reaction crucible 320, and a gas transmission tube 360 for injecting, bubbling or otherwise dispersing a gas into the contents disposed within the reaction crucible 320. In the one pot apparatus 300, the reaction crucible 320 serves as a cathode electrode for electrodeposition in conjunction with the anode electrode 330. The one pot apparatus 300 further comprises as power supply (not shown) coupled with the reaction crucible 320 and the anode electrode 330 by wires 370 and 380, respectively, for applying a current between the reaction crucible 320 and the anode electrode 330 to recover purified precious metals via electrodeposition.

One or both of the reaction crucible 320 and the anode electrode 330 can be made of a non-porous glassy carbon material, a non-porous ceramic filled graphite material, a porous or non-porous graphite, or any other suitable material known to one of ordinary skill in the art. In some instances, the reaction crucible 320 can be made of a corrosion resistant material such as high performance alloys such as Hastelloy® (nickel-molybdenum-chromium alloys) or Inconel® (nickel-chromium alloys). In FIG. 3, the heating element 310 is a heat bath filled with sand. In some instances, the heating element 310 can be a heat bath filled with an oil or oil mixture. In other instances, the heating element 310 can be a thermal jacket, a coiled tubing or coiled filament heating assembly, or any other suitable heating element known to one of ordinary skill in the art. The impeller 350 and the gas transmission tube 360 can be made of any chemically, thermally and corrosion resistant, and non- or lowly conductive, material known to one or ordinary skill in the art. In some instances, the one or both of the impeller 350 and the gas transmission tube 360 can be made of a corrosion resistant material such as high performance alloys such as Hastelloy® (nickel-molybdenum-chromium alloys) or Inconel (nickel-chromium alloy). In some instances, one or both of the impeller 350 and the gas transmission tube 360 can be made of a glass such as a borosilicate or a borofluorosilicate glass. In other instances, one or both of the impeller 350 and the gas transmission tube 360 can be made of a ceramic.

Figure 4:
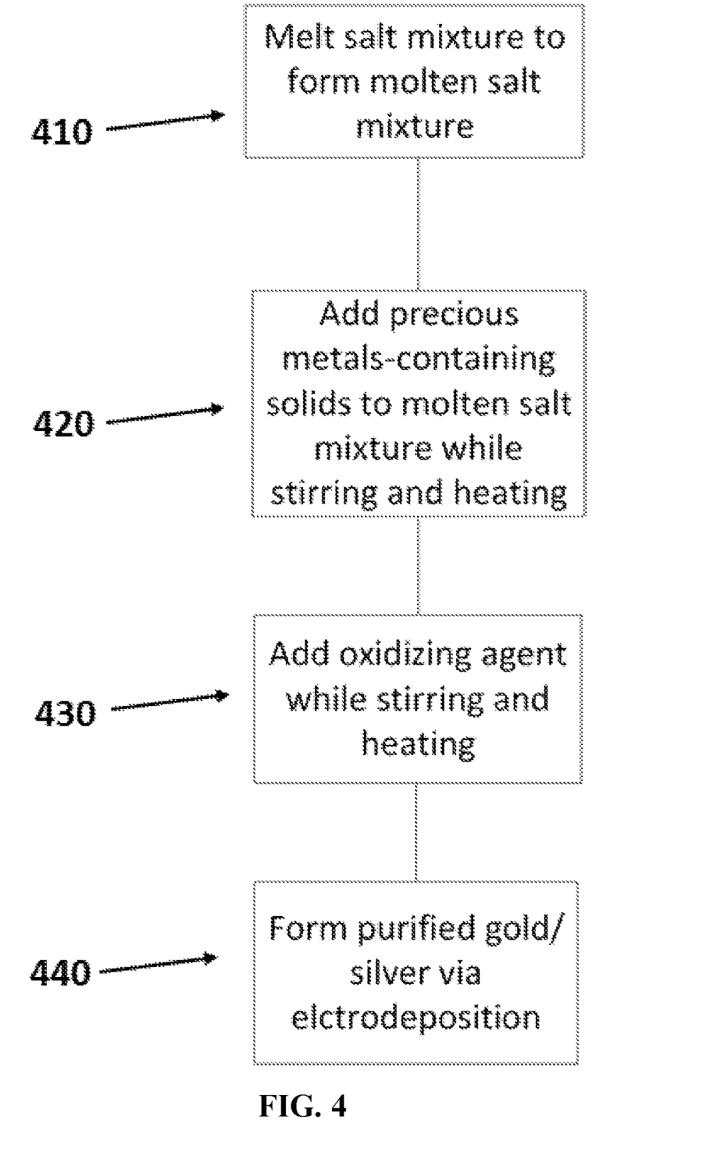
FIG. 4 is a flowchart illustrating a method of recovering gold and silver from a precious metals-containing solid using a one pot-metal extraction and electrodeposition apparatus in accordance with various aspects of the present disclosure.

FIG. 4 is a flowchart illustrating a method of recovering gold and silver from a precious metals-containing solid using a one pot-metal extraction and electrodeposition apparatus in accordance with various aspects of the present disclosure. In block 410, a salt mixture is heated in a reaction crucible, such as the reaction crucible 320 of FIG. 3, using a heating element, such as the heating element 310, to form a molten salt mixture. The salt mixture can be a mixture of NaCl, KCl and $ZnCl_2$. In some instances, the salt mixture can be a eutectic mixture having a molar ratio of approximately 0.5:0.5:1.0 (NaCl:KCl:$ZnCl_2$). In some instances, the salt mixture can have about 7.5 to about 20 mol % NaCl, alternatively about 10 to about 17.5 mol % NaCl, alternatively about 12.5 to about 15 mol % NaCl, and alternatively about 13 to about 14 mol % NaCl. In some instances, the salt mixture can have about 25 to about 40 mol % KCl, alternatively about 27.5 to about 37.5 mol % KCl, alternatively about 30 to about 35 mol % KCl, and alternatively about 33 to about 34 mol % KCl. In some instances, the salt mixture can have about 40 to about 70 mol % $ZnCl_2$, alternatively about 45 to about 65 mol % $ZnCl_2$, alternatively about 50 to about 60 mol % $ZnCl_2$, and alternatively about 52.5 to about 55 mol % $ZnCl_2$. In some instances, a portion or all of the $ZnCl_2$ can be replaced with $AlCl_3$, $CaCl_2$), LiCl and/or $MgCl_2$. To convert the salt mixture to a molten salt mixture, the salt mixture can be heated, with or without stirring, at a temperature ranging from about 200° C. to about 800° C., alternatively about 250° C. to about 500° C., alternatively about 300° C. to about 450° C., and alternatively about 350° C. to about 400° C.

In some instances, one or more ionic liquids are used instead of a salt mixture. When one or more ionic liquids are used instead of a salt mixture, the one or more ionic liquids are heated, with or without stirring, at any of the above identified temperatures ranges in block 410.

In block 420, an ore or a slag by-product containing precious metals (collectively referred to as "precious metals-containing solids" is added to the molten salt mixture and stirred while heating at a temperature in a range as defined above with regard to molten salt mixture formation. Stirring is performed until sufficiently complete mixing of the molten salt mixture (or one or more ionic liquids) and the precious metals-containing solids is accomplished. The stir rate can be about 100 to about 1000 rotations per minute (rpm), alternatively about 200 to about 800 rpm, alternatively about 300 to about 700 rpm, alternatively about 400 to about 600 rpm, and alternatively about 500 rpm. The time required to ensure sufficiently complete mixing of the molten salt mixture and the precious metals-containing solids can range from about 1 minute to about 1 hour, alternatively about 5 to about 30 minutes, and alternatively about 10 to about 15 minutes.

In block 430, an oxidizing agent is added to the molten salt/precious metals-containing solids mixture and stirred while heating at a temperature in a range as defined above with regard to molten salt mixture formation. In some instances the oxidizing agent is a gas. In some instances, the gaseous oxidizing agent is pure or substantially pure oxygen ($O_2$). In other instances, the gaseous oxidizing agent can be pure or substantially pure ozone ($O_3$), nitrous oxide ($N_2O$), nitric oxide (NO) or any other suitable gaseous oxidizing agent which leads to the formation of soluble gold salts and soluble silver salts. In some instances, the oxidizing agent is a non-gaseous compound having one or more cations and one or more anions. The one or more cations of the non-gaseous compound can include, for example, $Li^+$, $Na^+$, $K^+$, $Be^{2+}$, $Mg^{2+}$, $Ca^{2+}$, $Sr^{2+}$, $Ba^{2+}$, $Al^{3+}$, $Sn^{4+}$, $Sn^{2+}$, $NH_4^+$, $PH_4^+$, a primary ammonium or phosphonium cation, a secondary ammonium or phosphonium cation, a tertiary ammonium or phosphonium cation, and a quaternary ammonium or phosphonium cation. In some instances, it is preferable that the non-gaseous compound have $Na^+$ or $K^+$ as the cation. The one or more anions of the non-gaseous compound can include, for example, nitrate, nitrite, hydroxide, phosphate, hydrogen phosphate, dihydrogen phosphate, carbonate, bicarbonate, hypochlorite, chlorite, chlorate, perchlorate, hypobromite, bromite, bromate, perbromate, hypoiodite, iodite, iodate, periodate, acetate, permanganate, chromate, dichromate, and oxalate. In some instances, it is preferable that the non-gaseous compound has chlorate or bromate as the anion. In some instances, it is preferable that the non-gaseous compound has nitrate or nitrite as the anion. In accordance with various aspects of the present disclosure, compounds such as potassium chlorate, sodium chlorate, potassium nitrate, sodium nitrate, potassium dihydrogen phosphate, sodium bromate or potassium perbromate as particularly useful oxidizing agents.

When a gaseous oxidizing agent is used, the gaseous oxidizing agent can be added to the molten salt/precious metals-containing solids mixture by injecting, bubbling or otherwise dispersing the gas therein while stirring at a stir rate in a range as defined above with regard to molten salt/precious metals-containing solids mixture formation. The gaseous oxidizing agent can be injected, bubbled or otherwise dispersed from a gas source at a rate ranging from about 10 to about 500 standard cubic centimeters per minute (sccm), alternatively about 25 to about 400 sccm, alternatively about 50 to about 300 sccm, alternatively about 75 to about 200 sccm, and alternatively about 100 to about 150 sccm. The gaseous oxidizing agent can be injected, bubbled or otherwise dispersed into the molten salt/precious metals-containing solids mixture for a period of time ranging from about 15 minutes to about 6 hours, alternatively about 30 minutes to about 4 hours, alternatively about 1 hour to about 3 hours, and alternatively about 2 hours. After injecting, bubbling or otherwise dispersing the gaseous oxidizing agent defined period of time, a liquid solution containing soluble gold and silver salts is produced and addition to of the oxidizing agent is terminated.

When a non-gaseous oxidizing agent is used, the non-gaseous oxidizing agent can be added to the molten salt/precious metals-containing solids mixture in a as a single mass of over a pre-defined period of time. After addition of the non-gaseous oxidizing agent is complete, the mixture is allowed to react while stirring under heat. The mixture can be allowed to react for a period of time ranging from about 15 minutes to about 6 hours, alternatively about 30 minutes to about 4 hours, alternatively about 1 hour to about 3 hours, and alternatively about 2 hours, to form a liquid solution in the reaction crucible, the liquid solution containing soluble gold and silver salts.

In some instances, both a gaseous and a non-gaseous oxidizing agent can be used in block 430.

In block 440, an anode electrode is placed in the reaction crucible and partially submerged in the liquid solution. A power supply is coupled with the anode electrode and the reaction crucible which acts as a cathode electrode. Gold and silver ions from the liquid solution are then electrodeposited as pure metals on the cathode electrode (that is, the reaction crucible), or sink to the bottom of the reaction crucible, using an applied voltage provided by the power supply. The applied voltage can range from about 2.5 to 4 volts and can have a current density ranging from about 30 to about 50 mA/cm$^2$. The metal electrodeposited on the surface of the reaction crucible can be retrieved by removing the reaction crucible from the heating element and removing the metal therefrom. The formed metal that is not electrodeposited on the reaction electrode, being denser than the remaining liquid solution containing the salt mixture, sinks to the bottom of the reaction crucible and can be retrieved by, for example, decantation. The remaining precious metal-depleted liquid can be recycled and reused in the extraction of metal from new precious metals-containing solids.

EXAMPLES

The Examples provided below are merely exemplary and should not be construed as limiting the appended claims in any way.

The reagents used were sodium chloride (NaCl), potassium chloride (KCl), zinc chloride ($ZnCl_2$), silver chloride, and 99.99% silver wire (Alfa Aesar, Premion grade). In the following examples, an apparatus according to FIG. 3 was used. The components on the apparatus were a heating mantle (Glas Col), 99.9% graphite crucibles (Wang Xueping, Singapore), glassy carbon crucibles (SPI Supplies/Structure Probe, Inc., West Chester, Pa.), graphite rods (McMaster Carr), power supply (Circuit Specialists, Tempe, Ariz.), BioLogic potentiostat (Oak Ridge, Tenn.). A home made reference electrode was made of silver wire in a solution of silver chloride in potassium chloride in a quartz vessel with a zirconia rod sealed into the quartz on the side of the vessel immersed the molten salt to make a tortuous ion flow path, and this Ag/AgCl electrode (SSE) was found to have a potential of 0.2 V versus NEE.

The ore used in the experiments below was a sulfidic refractory ore having a composition as shown in the table below.

| Au (g/t) | Ag (g/t) | As (g/t) | Zn (%) | Cu (%) | Fe (%) | Pb (%) | S (%) | Mo (%) | Mn (%) |
|---|---|---|---|---|---|---|---|---|---|
| 47.00 | 5471 | 1710 | 3.72 | 0.66 | 18.77 | 2.20 | 32.45 | 0.07 | 0.19 |

Example #1 (Comparative)—Recovery of Gold/Silver Using a Molten Salt Mixture 150 g salt mixture (7.45 wt % NaCl-23.91 wt % KCl-68.63 wt % $ZnCl_2$) was melted at 350-400° C. in a glassy carbon crucible to form a molten salt mixture, using a heating mantle. 20 g of ore was then slowly added to the molten salt mixture while stirring at approximately 500 rpm to form a molten salt/ore mixture. The molten salt/ore mixture was kept at the above conditions of heating and stirring for about 2 hours. After the 2 hour period (the leaching process), a graphite rod anode was then inserted into the glassy carbon crucible and the electrodeposition process was started by applying voltage (or potential) of 2.5V between the glassy carbon crucible (cathode) and the graphite rod anode for 2 hours while the mixture was under the conditions of heating and stirring disclosed above. After the 2 hour period, purified gold and silver was recovered from the crucible and the cathode surface, yielding a gold/silver recovery rate less than 15%.

Example 2—Recovery of Gold/Silver Using a Molten Salt Mixture and Oxygen (Oxidizing Agent)

150 g salt mixture (7.45 wt % NaCl-23.91 wt % KCl-68.63 wt % $ZnCl_2$) was melted at 350-400° C. in a glassy carbon crucible to form a molten salt mixture, using a heating mantle. 20 g of ore was then slowly added to the molten salt mixture while stirring at approximately 500 rpm to form a molten salt/ore mixture. The molten salt/ore mixture was kept at the above conditions of heating and stirring for about 10 minutes to ensure complete mixing the ore with the salt. Then oxygen gas was added to the molten salt/ore mixture, at a flow rate of 100 sccm, while heating and stirring for a period of 2 hours. After the 2 hour period (the leaching process), the addition of oxygen gas was terminated and a graphite rod anode was then inserted into the glassy carbon crucible and the electrodeposition process was started by applying voltage (or potential) of 2.5V between the glassy carbon crucible (cathode) and the graphite rod anode for 2 hours while the mixture was under the conditions of heating and stirring disclosed above. After the 2 hour period, purified gold and silver was recovered from the crucible and the cathode surface, yielding a gold/silver recovery rate of about 55-60% (range exhibited by multiple experiments).

Example 3—Recovery of Gold/Silver Using a Molten Salt Mixture and NaClO₃ (Oxidizing Agent)

150 g salt mixture (7.45 wt % NaCl-23.91 wt % KCl-68.63 wt % $ZnCl_2$) was melted at 350-400° C. in a glassy carbon crucible to form a molten salt mixture, using a heating mantle. 20 g of ore was then slowly added to the molten salt mixture while stirring at approximately 500 rpm to form a molten salt/ore mixture. The molten salt/ore mixture was kept at the above conditions of heating and stirring for about 10 minutes to ensure complete mixing the ore with the salt. Then 2 g of $NaClO_3$ was added to the molten salt/ore mixture. $NaClO_3$ addition was conducted very slowly under stirring and heating. After addition of the $NaClO_3$ was complete, stirring and heating was maintained for 2 hours (the leaching process). A graphite rod anode was then inserted into the glassy carbon crucible and the electrodeposition process was started by applying voltage (or potential) of 2.5V between the glassy carbon crucible (cathode) and the graphite rod anode for 2 hours while the mixture was under the conditions of heating and stirring disclosed above. After the 2 hour period, purified gold and silver was recovered from the crucible and the cathode surface, yielding a gold/silver recovery rate of about 90% (average of multiple experiments).

Example 4—Recovery of Gold/Silver Using a Molten Salt Mixture and KClO₃ (Oxidizing Agent)

150 g salt mixture (7.45 wt % NaCl-23.91 wt % KCl-68.63 wt % $ZnCl_2$) was melted at 350-400° C. in a glassy carbon crucible to form a molten salt mixture, using a heating mantle. 20 g of ore was then slowly added to the molten salt mixture while stirring at approximately 500 rpm to form a molten salt/ore mixture. The molten salt/ore mixture was kept at the above conditions of heating and stirring for about 10 minutes to ensure complete mixing the ore with the salt. Then 2 g of $KClO_3$ was added to the molten salt/ore mixture. $KClO_3$ addition was conducted very slowly under stirring and heating. After addition of the $KClO_3$ was complete, stirring and heating was maintained for 2 hours (the leaching process). A graphite rod anode was then inserted into the glassy carbon crucible and the electrodeposition process was started by applying voltage (or potential) of 2.5V between the glassy carbon crucible (cathode) and the graphite rod anode for 2 hours while the mixture was under the conditions of heating and stirring disclosed above. After the 2 hour period, purified gold and silver was recovered from the crucible and the cathode surface, yielding a gold/silver recovery rate of about 90% (average of multiple experiments).

Example 5—Large Scale Recover)) of Gold/Silver Using a Molten Salt Mixture and KClO₃ (Oxidizing Agent)

1000 g salt mixture (7.45 wt % NaCl-23.91 wt % KCl-68.63 wt % $ZnCl_2$) was melted at 350° C. in a fused quartz crucible to form a molten salt mixture, using a heating mantle. 250 g of ore was then slowly added to the molten salt mixture while stirring at approximately 500 rpm to form a molten salt/ore mixture. The molten salt/ore mixture was kept at the above conditions of heating and stirring for about 10 minutes to ensure complete mixing the ore with the salt. Then 25 g of $KClO_3$ was added to the molten salt/ore mixture. $KClO_3$ addition was conducted very slowly under stirring and heating. After addition of the $KClO_3$ was complete, stirring and heating was maintained for 2 hours (the leaching process). Two cathode metal plates (Hastelloy® X, a nickel-chromium-iron-molybdenum alloy) and one anode graphite rod were then inserted into the crucible and the electrodeposition process was started by applying voltage (or potential) of 2.5V between the cathode plates and the anode rod for 2 hours while the mixture was under the conditions of heating and stirring disclosed above. After the 2 hour period, purified gold and silver was recovered from the cathode plates, yielding a gold/silver recovery rate of about 90% (average of multiple experiments).

Example 6—Large Scale Recover)) of Gold/Silver Using a Molten Salt Mixture and NaClO₃ (Oxidizing Agent)

1000 g salt mixture (7.45 wt % NaCl-23.91 wt % KCl-68.63 wt % $ZnCl_2$) was melted at 350° C. in a fused quartz crucible to form a molten salt mixture, using a heating mantle. 250 g of ore was then slowly added to the molten salt mixture while stirring at approximately 500 rpm to form a molten salt/ore mixture. The molten salt/ore mixture was kept at the above conditions of heating and stirring for about 10 minutes to ensure complete mixing the ore with the salt. Then 25 g of $NaClO_3$ was added to the molten salt/ore mixture. $NaClO_3$ addition was conducted very slowly under stirring and heating. After addition of the $NaClO_3$ was complete, stirring and heating was maintained for 2 hours (the leaching process). Two cathode metal plates (Hastelloy® X, a nickel-chromium-iron-molybdenum alloy) and one anode graphite rod were then inserted into the crucible and the electrodeposition process was started by applying voltage (or potential) of 2.5V between the cathode plates and the anode rod for 2 hours while the mixture was under the conditions of heating and stirring disclosed above. After the 2 hour period, purified gold and silver was recovered from the cathode rods, yielding a gold/silver recovery rate of about 90% (average of multiple experiments).

While the examples above utilize certain amounts of reagents or reaction conditions such as reaction time, temperature, applied voltage, etc. One of ordinary skill in the art will appreciate that such variables may be modified without imparting from the scope of the examples or the subject matter described in the present disclosure.

Statements of the Disclosure

Statements of the Disclosure include:

Statement 1: A method for the recovery of precious metals from a precious metals-containing solid, the method comprising heating a salt mixture to form a molten salt mixture, adding a precious metals-containing solid to the molten salt mixture to form a molten salt/precious metals-containing solids mixture, adding an oxidizing agent to the molten salt/precious metals-containing solids mixture, forming a liquid solution from molten salt/precious metals-containing solids mixture, the liquid solution comprising soluble precious metal salts, and subjecting the liquid solution to an electrodeposition process to form purified precious metals.

Statement 2: A method in accordance with Statement 1, wherein the precious metals-containing solid is an ore.

Statement 3: A method in accordance with Statement 1, wherein the precious metals-containing solid is a slag by-product.

Statement 4: A method in accordance with any one of Statements 1-3, wherein the precious metals comprise gold and silver.

Statement 5: A method in accordance with any one of Statements 1-4, wherein the salt mixture comprises NaCl, KCl and $ZnCl_2$.

Statement 6: A method in accordance with any one of Statements 1-5, wherein the salt mixture comprises is a eutectic mixture having a $NaCl:KCl:ZnCl_2$ molar ratio of approximately 0.5:0.5:1.0.

Statement 7: A method in accordance with any one of Statements 1-6, wherein the salt mixture comprises about 7.5 to about 20 mol % NaCl, about 25 to about 40 mol % KCl, and about 40 to about 70 mol % $ZnCl_2$.

Statement 8: A method in accordance with any one of Statements 1-7, wherein the oxidizing agent is a gas.

Statement 9: A method in accordance with Statement 8, wherein the gas is any one of oxygen, ozone, nitrous oxide, and nitric oxide.

Statement 10: A method in accordance with Statement 8 or Statement 9, wherein the gas is oxygen.

Statement 11: A method in accordance with any one of Statements 1-7, wherein the oxidizing agent is non-gaseous and comprises at least one cationic component and at least one anionic component.

Statement 12: A method in accordance with Statement 11, wherein the at least one cationic component is any one of $Li^+$, $Na^+$, $K^+$, $Be^{2+}$, $Mg^{2+}$, $Ca^{2+}$, $Sr^{2+}$, $Ba^{2+}$, $Al^{3+}$, $Sn^{4+}$, $Sn^{2+}$, $NH_4^+$, $PH_4^+$, a primary ammonium or phosphonium cation, a secondary ammonium or phosphonium cation, a tertiary ammonium or phosphonium cation, and a quaternary ammonium or phosphonium cation.

Statement 13: A method in accordance with Statement 11 or Statement 12, wherein the at least one cationic component is $Na^+$ or $K^+$.

Statement 14: A method in accordance with any one of Statements 11-13, wherein the at least one anionic component is any one of nitrate, nitrite, hydroxide, phosphate, hydrogen phosphate, dihydrogen phosphate, carbonate, bicarbonate, hypochlorite, chlorite, chlorate, perchlorate, hypobromite, bromite, bromate, perbromate, hypoiodite, iodite, iodate, periodate, acetate, permanganate, chromate, dichromate, and oxalate.

Statement 15: A method in accordance with any one of Statements 11-14, wherein the at least one anionic component is chlorate or bromate.

Statement 16: A method in accordance with any one of Statements 11-14, wherein the at least one anionic component is nitrate or nitrite.

Statement 17: A method in accordance with any one of Statements 1-16, further comprising separating the liquid solution from unreacted solids prior to the electrodeposition process.

Statement 18: A method in accordance with Statement 17, wherein separation is performed by any one of filtration, decanting and gravity separation.

Statement 19: A method in accordance with any one of Statements 1-18, further comprising heating the molten salt/precious metals-containing solids mixture.

Statement 20: A method in accordance with any one of Statements 1-19, further comprising heating the molten salt/precious metals-containing solids mixture while adding the oxidizing agent.

Although the present invention and its objects, features and advantages have been described in detail, other embodiments are encompassed by the invention. Finally, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A method for the recovery of precious metals from a precious metals-containing solid, the method comprising:
   heating a salt mixture to form a molten salt mixture;
   adding a precious metals-containing solid to the molten salt mixture to form a molten salt/precious metals-containing solids mixture;
   adding a non-gaseous oxidizing agent to the molten salt/precious metals-containing solids mixture, the non-gaseous oxidizing agent comprising at least one cationic component and at least one anionic component;
   forming a liquid solution from the molten salt/precious metals-containing solids mixture, the liquid solution comprising soluble precious metal salts; and
   subjecting the liquid solution to an electrodeposition process to form purified precious metals.

2. The method of claim 1, wherein the at least one cationic component is any one of $Li^+$, $Na^+$, $K^+$, $Be^{2+}$, $Mg^{2+}$, $Ca^{2+}$, $Sr^{2+}$, $Ba^{2+}$, $Al^{3+}$, $Sn^{4+}$, $Sn^{2+}$, $NH_4^+$, $PH_4^+$, a primary ammonium or phosphonium cation, a secondary ammonium or phosphonium cation, a tertiary ammonium or phosphonium cation, and a quaternary ammonium or phosphonium cation.

3. The method of claim 1, wherein the at least one cationic component is $Na^+$ or $K^+$.

4. The method of claim 1, wherein the at least one anionic component is any one of nitrate, nitrite, hydroxide, phosphate, hydrogen phosphate, dihydrogen phosphate, carbonate, bicarbonate, hypochlorite, chlorite, chlorate, perchlorate, hypobromite, bromite, bromate, perbromate, hypoiodite, iodite, iodate, periodate, acetate, permanganate, chromate, dichromate, and oxalate.

5. The method of claim 1, wherein the at least one anionic component is chlorate, perchlorate, bromate, nitrate or nitrite.

6. The method of claim 1, wherein the precious metals-containing solid is an ore or a slag by-product.

7. The method of claim 1, wherein the precious metals comprise gold and silver.

8. The method of claim 1, wherein the salt mixture comprises NaCl, KCl and $ZnCl_2$.

9. The method of claim 8, wherein the salt mixture is a eutectic mixture having a $NaCl:KCl:ZnCl_2$ molar ratio of approximately 0.5:0.5:1.0.

10. The method of claim 8, wherein the salt mixture comprises:
    about 7.5 to about 20 mol % NaCl,
    about 25 to about 40 mol % KCl, and
    about 40 to about 70 mol % $ZnCl_2$.

11. The method of claim 1, further comprising separating the liquid solution from unreacted solids prior to the electrodeposition process.

12. The method of claim 1, further comprising heating the molten salt/precious metals-containing solids mixture before or during addition of the non-gaseous oxidizing agent.

13. The method of claim 1, wherein the at least one anionic component is chlorate.

14. The method of claim 1, wherein the at least one anionic component is perchlorate.

15. The method of claim 1, wherein the at least one anionic component is bromate.

16. The method of claim 1, wherein the at least one anionic component is nitrate.

17. The method of claim 1, wherein the at least one anionic component is nitrite.

18. The method of claim 1, wherein the at least one cationic component is any one of $Li^+$, $Be^{2+}$, $Mg^{2+}$, $Ca^{2+}$, $Sr^{2+}$, $Ba^{2+}$, $Al^{3+}$, $Sn^{4+}$, or $Sn^{2+}$.

19. The method of claim 1, wherein the at least one cationic component is $NH_4^+$, or $PH_4^+$.

20. The method of claim 1, wherein the at least one cationic component is any one of a primary ammonium or phosphonium cation, a secondary ammonium or phosphonium cation, a tertiary ammonium or phosphonium cation, and a quaternary ammonium or phosphonium cation.

\* \* \* \* \*